(12) United States Patent
Lovett et al.

(10) Patent No.: US 10,274,915 B2
(45) Date of Patent: Apr. 30, 2019

(54) SCALABLE CYBER-PHYSICAL STRUCTURE MANAGEMENT

(71) Applicant: Carrier Corporation, Farmington, CT (US)

(72) Inventors: Teems E. Lovett, East Hartford, CT (US); Francesco Leonardi, East Hartford, CT (US)

(73) Assignee: CARRIER CORPORATION, Farmington, CT (US)

( * ) Notice: Subject to any disclaimer, the term of this patent is extended or adjusted under 35 U.S.C. 154(b) by 36 days.

(21) Appl. No.: 15/520,343

(22) PCT Filed: Oct. 21, 2015

(86) PCT No.: PCT/US2015/056554
§ 371 (c)(1),
(2) Date: Apr. 19, 2017

(87) PCT Pub. No.: WO2016/064942
PCT Pub. Date: Apr. 28, 2016

(65) Prior Publication Data
US 2017/0336765 A1 Nov. 23, 2017

Related U.S. Application Data

(60) Provisional application No. 62/067,116, filed on Oct. 22, 2014.

(51) Int. Cl.
G05B 13/00 (2006.01)
G05B 15/02 (2006.01)
G06F 9/50 (2006.01)

(52) U.S. Cl.
CPC ............ *G05B 15/02* (2013.01); *G06F 9/5011* (2013.01); *G06F 9/5027* (2013.01);
(Continued)

(58) Field of Classification Search
CPC ...................................................... G05B 15/02
(Continued)

(56) References Cited

U.S. PATENT DOCUMENTS

| 5,506,768 A | 4/1996 | Seem et al. |
| 6,223,544 B1 | 5/2001 | Seem |

(Continued)

FOREIGN PATENT DOCUMENTS

| CA | 2344908 A1 | 1/2002 |
| KR | 100643264 B1 | 10/2006 |

OTHER PUBLICATIONS

International Search Report and Written Opinion for application PCT/US2015/056554, dated Jan. 15, 2016, 12pgs.

*Primary Examiner* — Suresh Suryawanshi
(74) *Attorney, Agent, or Firm* — Cantor Colburn LLP

(57) ABSTRACT

A method of managing structure resources of a cyber-physical structure includes identifying the structure resources of the cyber-physical structure, the structure resources including dynamic resources configured to provide dynamic structure data over time based on monitoring the cyber-physical structure over time; identifying, by a structure management computer system, applicable structure-management templates which include one or more operation algorithms for managing the structure resources and one or more required-resource descriptions defining structure resources required by the one or more operation algorithms, the applicable structure management templates identified based on matching identified structure resources to the required-resource descriptions of the structure-management templates; and applying, by the structure management computer system, one or more of the applicable structure-management templates as structure management systems to manage operation of the cyber-physical structure by imple-
(Continued)

menting the operation algorithms using the dynamic structure data.

14 Claims, 3 Drawing Sheets

(52) U.S. Cl.
CPC .... *G06F 9/5094* (2013.01); *G05B 2219/2642* (2013.01); *Y02D 10/22* (2018.01)

(58) Field of Classification Search
USPC ........................................................ 700/275
See application file for complete search history.

(56) References Cited

U.S. PATENT DOCUMENTS

| | | | |
|---|---|---|---|
| 7,505,877 B2 | 3/2009 | Salsbury | |
| 7,512,450 B2 * | 3/2009 | Ahmed | G05B 15/02 |
| | | | 700/19 |
| 8,635,182 B2 | 1/2014 | MacKay | |
| 8,731,724 B2 | 5/2014 | Drees et al. | |
| 8,788,097 B2 | 7/2014 | Drees et al. | |
| 9,804,581 B2 * | 10/2017 | Canedo | G06F 9/455 |
| 2009/0132097 A1 | 5/2009 | Sharma et al. | |
| 2010/0017739 A1 * | 1/2010 | Han | H04L 67/36 |
| | | | 715/772 |
| 2011/0093424 A1 | 4/2011 | Zimmermann et al. | |
| 2011/0167025 A1 | 7/2011 | Danai | |
| 2012/0060505 A1 | 3/2012 | Fuller et al. | |
| 2012/0072029 A1 | 3/2012 | Persaud | |
| 2012/0330465 A1 | 12/2012 | O'Neill et al. | |
| 2013/0081048 A1 | 3/2013 | Kobayashi | |
| 2013/0178999 A1 | 7/2013 | Geissler et al. | |
| 2014/0074730 A1 | 3/2014 | Arensmeier et al. | |
| 2014/0142727 A1 | 5/2014 | Giering et al. | |

* cited by examiner

SCALABLE CYBER-PHYSICAL STRUCTURE MANAGEMENT

BACKGROUND OF THE INVENTION

Embodiments relate to managing cyber-physical structures, and in particular to the scalable management of cyber-physical structures using structure-management templates.

Developing a building control strategy requires significant manual effort to identify data that can be obtained from a building and the types of systems that can be implemented to control the building based on the available data. With increasing demand for advanced diagnostic and control strategies, manually developing advanced techniques is typically not cost-effective. At present, there is no consistent way of representing diagnostic and control algorithms for reducing the effort and cost of developing and deploying building control strategies.

BRIEF DESCRIPTION OF THE INVENTION

An exemplary embodiment includes a method of managing structure resources of a cyber-physical structure includes identifying the structure resources of the cyber-physical structure, the structure resources including dynamic resources configured to provide dynamic structure data over time based on monitoring the cyber-physical structure over time; identifying, by a structure management computer system, applicable structure-management templates which include one or more operation algorithms for managing the structure resources and one or more required-resource descriptions defining structure resources required by the one or more operation algorithms, the applicable structure management templates identified based on matching identified structure resources to the required-resource descriptions of the structure-management templates; and applying, by the structure management computer system, one or more of the applicable structure-management templates as structure management systems to manage operation of the cyber-physical structure by implementing the operation algorithms using the dynamic structure data.

Another exemplary embodiment includes a structure management computer system, including memory for storing dynamic structure data received from structure resources of a cyber-physical structure, the dynamic structure data generated by dynamic structure resources over time based on monitoring the cyber-physical structure over time; and at least one processor configured to identify the structure resources of the cyber-physical structure, to identify applicable structure-management templates which include one or more operation algorithms for managing the structure resources and one or more required-resource descriptions defining structure resources required by the one or more operation algorithms, the applicable structure management templates identified based on matching identified structure resources to the required-resource descriptions of the structure-management templates, and configured to apply one or more of the applicable structure-management templates as structure management systems to manage operation of the cyber-physical structure by implementing the operation algorithms using the dynamic structure data.

Another exemplary embodiment includes structure-management template distribution system including memory having stored therein structure-management templates for managing operation of a cyber-physical structure, the structure-management templates including one or more operation algorithms for managing structure resources of the cyber-physical resources, and one or more required-resource descriptions defining structure resources required by the one or more operation algorithms, the structure resources including dynamic resources configured to provide dynamic structure data over time based on monitoring the cyber-physical structure over time, the memory further storing customer subscription data; and a processor configured to generate the customer subscription data based on receiving customer input regarding structure-management templates and applications that are to be made available to the customer, and configured to distribute to a customer computer one or more structure-management templates based on determining that the customer has subscribed to the one or more structure-management templates.

Additional embodiments are described below.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Development of control systems for cyber-physical structures is a time- and cost-intensive process without any consistent way of defining available data. Embodiments relate to scalable management processes for cyber-physical structures.

Figure 1:
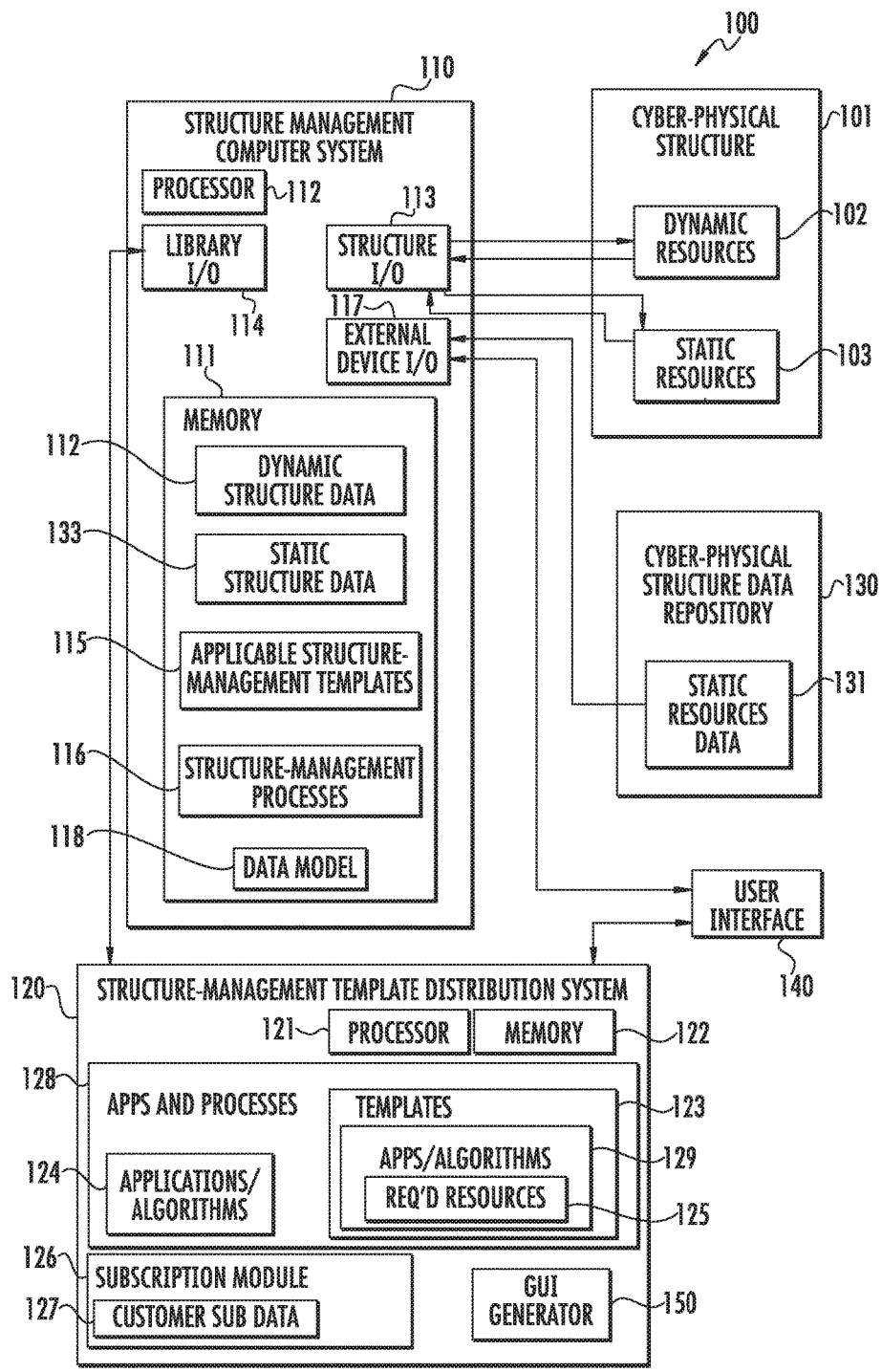
FIG. 1 is a diagram of a scalable cyber-physical structure management system according to one embodiment.

FIG. 1 is a block diagram of a scalable cyber-physical structure management system 100 according to one embodiment. Cyber-physical structure management system 100 includes a collaboration of computational elements for controlling physical entities. The system 100 includes a cyber-physical structure 101 having one or more dynamic structure resources 102. In the present specification and claims, dynamic structure resources 102 are defined as resources that generate data that typically changes over time, or resources that may receive control signals that change over time. Examples of dynamic structure resources 102 that generate data include sensors, and examples of dynamic structure resources 102 that receive control signals include appliances, heating, ventilation, and air-conditioning (HVAC) hardware, automated window blinds, elevators, fire alarms, security systems, etc. The cyber-physical structure 101 also includes static resources 103, defined as resources that do not change over time, such as design characteristics. In an embodiment in which the cyber-physical structure is a building, examples of dynamic structure resources 102 include temperature and pressure sensor which generate data over time regarding the temperature and pressure in the building, and an HVAC system which receives control signals to condition an environment in the building. Examples of static structure resources 103 include cyber-physical dimensions (e.g. volume) of the building, air duct locations, volumes, and sizes, electrical wiring, location of electrical boxes, plumbing hardware, chiller capacity, and other cyber-physical characteristics that do not typically change over time.

In embodiments of the invention, the cyber-physical structure 101 may be a building or other structure that houses people or objects. In such an embodiment, the dynamic resources 102 may include devices that detect conditions in the building and control conditions in the building. The cyber-physical structure 101 may alternatively be one or more systems associated with a building, such as an HVAC system, power system, or any other system. In such an embodiment, the dynamic resources 102 may include components of the HVAC system such as motor sensors, temperature and pressure sensors in the HVAC system, and motor control inputs and circuits for controlling components of the HVAC system. The cyber-physical structure 101 may alternatively be one or more devices associated with a building, such as an air conditioning unit connected to a building to condition an environment in the building. In such an embodiment, the dynamic resources 102 may include sensors that monitor power to the air conditioning unit, temperatures of conduits from the air conditioning unit, etc., as control inputs to control operation of the air conditioning unit. In other words, the cyber-physical structure 101 may be any type of cyber-physical structure having dynamic resources to monitor and control the cyber-physical structure.

The system 100 further includes a structure management computer system 110. The structure management computer system 110 includes memory 111 and at least one processor 112. The structure management computer system 110 also includes a structure input/output (I/O) 113 to receive data, alarms and event notifications from the dynamic resources 102 and/or static resources 103 of the cyber-physical structure 101 and to transmit data and control signals to the dynamic resources 102. The structure I/O 113 may include a wired data communication line, a wireless data communication module, and any data processing circuitry required to perform data communications functions to receive data from the structure 101 and transmit data to the dynamic resources 102 of the cyber-physical structure 101.

The structure management computer system 110 further includes a library I/O module 114 for communicating with a structure-management template distribution system 120. The structure-management template distribution system 120, also referred to herein as a template library 120, is a computer system including a processor 121, memory 122, and other circuitry for storing templates 123 and subscription data 127 and receiving user or automated inputs regarding desired subscriptions.

As illustrated in FIG. 1, the template library 120 includes applications and processes 128 which include applications or algorithms 124 and structure-management templates 123. Templates include a representation of algorithms or applications 129 for managing cyber-physical structures, such as buildings or devices that condition an environment in the building, and lists required resources 125. Algorithms 124 include processes for managing cyber-physical structures, including receiving data from the structures, analyzing the data from the structures, and transmitting control signals to the structures. Required resources 125 define resources required by the algorithm 124 and resources (such as data or control signals) generated by the algorithm 124.

Examples of algorithms 124 include diagnostic algorithms for receiving or analyzing sensed data. For example, a diagnostic algorithm may include a required resource 125 of a sensor input to determine a temperature in a room, a required resource 125 of a control input to control an on/off state of an HVAC system, a required resource 125 of a temperature control of the HVAC system, and a required resource of a humidity control for the HVAC system. Another example of an algorithm 124 may be an energy-usage management algorithm. A first required resource 125 may be a room location based on a building design, a second required resource 125 may be a light sensor input, a third required resource may be determining a time of day from a clock, and the algorithm may include determining a light level in the room based on the sensor and room location, and controlling a light fixture required resource 125 to output a reduced level of light to reduce energy consumption. The management algorithms 124 may vary in complexity by incorporating more or less sensor data, controlling more or fewer devices, or performing more or less analysis of data received from required resources 125.

In some embodiments, the templates 123 include different templates for different types of equipment. In some embodiments, the templates 123 are updatable and upgradeable. For example, a lower-level template may perform a first type of analysis using a device, and a higher-level template may perform a second type of analysis using the device, which may provide more data or more useful data to a customer. In addition, as cyber-physical devices in a cyber-physical structure 101 are updated, the corresponding templates 123 for the upgraded devices may be accessed from the template library 120.

While only a few simple examples of algorithms 124 are provided for purposes of description, embodiments of the invention encompass any algorithms 124 of any level of complexity that may be used to manage cyber-physical structures by receiving data from the structures and/or by transmitting data or control signals to the structures.

Embodiments of the invention define processes and systems for connecting the data needed by templates 123 to implement structure-management processes 116 to manage a cyber-physical structure 101 with data available via the dynamic resources 102 and 112 and static resources 103 and 133 to automatically determine which structure management processes may be implemented in a cyber-physical structure 101. The automatic determination and matching of required and available resources is performed by the structure management computer system 110. The structure management processes from 116 are instantiations of the customer subscribed algorithms or applications 124.

The structure management computer system 110 accesses the templates 123 from the template library 120, and the structure data from the dynamic resources 102 and 112 and static resources 103 and 133. The computer system 110 then determines which templates among the templates 124 in the template library 120 qualify as "applicable structure-management templates 115." Applicable structure-management templates 115 are those templates having required resources 125 that match the available structure data and control from the dynamic resources 102 and static resources 103. In other words, a template 123 requiring only a temperature sensor and visual display control would be applicable to a cyber-physical structure 101 having a temperature sensor as a dynamic resource 102 and a visual display control as a dynamic resource 102 to receive display data. In contrast, the template 123 requiring the temperature sensor and visual display control would not be an applicable template for a structure 101 that lacked a visual display control.

In one embodiment, the computer system 110 analyzes the building data from the dynamic resources 102 and 112 and static resources 103 and 133 to determine the available resources, and recursively attempts to apply templates to identify applicable structure-management templates 115 based on the available building data and controls and the required resources 125 in the templates 123.

In one embodiment, identifying applicable structure-management templates 115 also includes analyzing customer subscription data 127 in a subscription module 126 of the template library 120 to determine the templates 123 and applications 124 to which a user has subscribed. In one embodiment, a user enters subscription preferences via a user interface 140. The graphical user interface (GUI) generator 150 of the template library 120 may provide a GUI with which a user may interact. Alternatively, the user interface 140 may be hosted by a third party, such as an online store, database, or repository listing templates that are available to a user or listing services that are available to a user. The user may then select templates, services, or subscriptions desired, and the subscription module 126 may store the customer subscription data 127. The subscription module 126 and GUI generator 150 may include processors and memory, or may be part of, or use, the processor 121 and memory 122 of the template library 120. The template library 120 may be one discrete computer or server within a single housing, or multiple networked computers, servers, and other electronic devices that together provide functionality to permit users to generate subscription data, to store the subscription data, and to store structure-management templates.

In one embodiment, the structure management computer system 110 transmits to the template library 120 user identification information associated with the cyber-physical structure 101, and the template library 120 provides to the structure-management computer system 110 templates available to the user based on the user's customer subscription data 127. The structure-management computer system 110 may then identify applicable structure-management templates from among the subscribed-to applications 124 based on the available dynamic resources 102 and 112 and static resources 103 and 133. As discussed above, the structure-management computer system 110 may identify the applicable structure-management templates by recursively comparing required resources 125 of subscribed-to templates and applications with the available dynamic resources 102 and 112 and static resources 103 and 133.

In one embodiment, the structure-management templates 123 are ranked based on an estimated level of utility to a user. For example, a higher-ranked template may provide additional data to a user or additional functionality to systems in the cyber-physical structure 101, while lower-ranked templates may provide relatively less data and less functionality. The structure management computer system 110 may recursively compare the required resources 125 of subscribed-to templates with available dynamic resources 102 and 112 and static resources 103 and 133 by first determining if templates are applicable in an order from highest-ranked templates to lowest-ranked templates.

In one embodiment, the structure management computer system 110 obtains static resources data 131 from a cyber-physical structure data repository 130. The repository 130 may be located in memory of the structure management computer system 110 or may be connected to the computer system 110 via a network connection, as illustrated in FIG. 1. In another embodiment, the computer system 110 obtains the static resources data 131 directly from a data repository in the cyber-physical structure 101.

Upon identifying applicable structure-management templates 115, the computer system 110 deploys the templates as structure-management processes 116 to manage the cyber-physical structure 101. For example, in an embodiment in which an applicable template includes an algorithm for sensing a temperature and displaying the temperature on a display device, the computer system 110 obtains temperature sensor data from a dynamic resource 102 that is a temperature sensor, generates display data, and transmits the display data to a display device or GUI 140

While FIG. 1 illustrates the structure management computer system 110 as a separate block from the cyber-physical structure 101 for purposes of description, embodiments encompass either an entire computer system 110 located within the cyber-physical structure 101, or one or more parts of the computer system 110 located within the cyber-physical structure. For example, the cyber-physical structure 101 may include control systems including processors and memory that receive applicable structure-management templates 115 from a computer system 110 or from the template library 120 and control the dynamic resources 102 of the cyber-physical structure 101 to implement the algorithms of the applicable structure-management templates 115.

Applied applicable structure management templates 115 are stored in memory 111 of the structure management computer system 110 as a data model 118. The data models 118 are instantiated templates 115 and cyber physical system data models representing the structure of the cyber-physical system. The data model 118 contains information about the data subscribed to by structure management processes 116 and the structure of the data required by the application or process 116.

Figure 2:
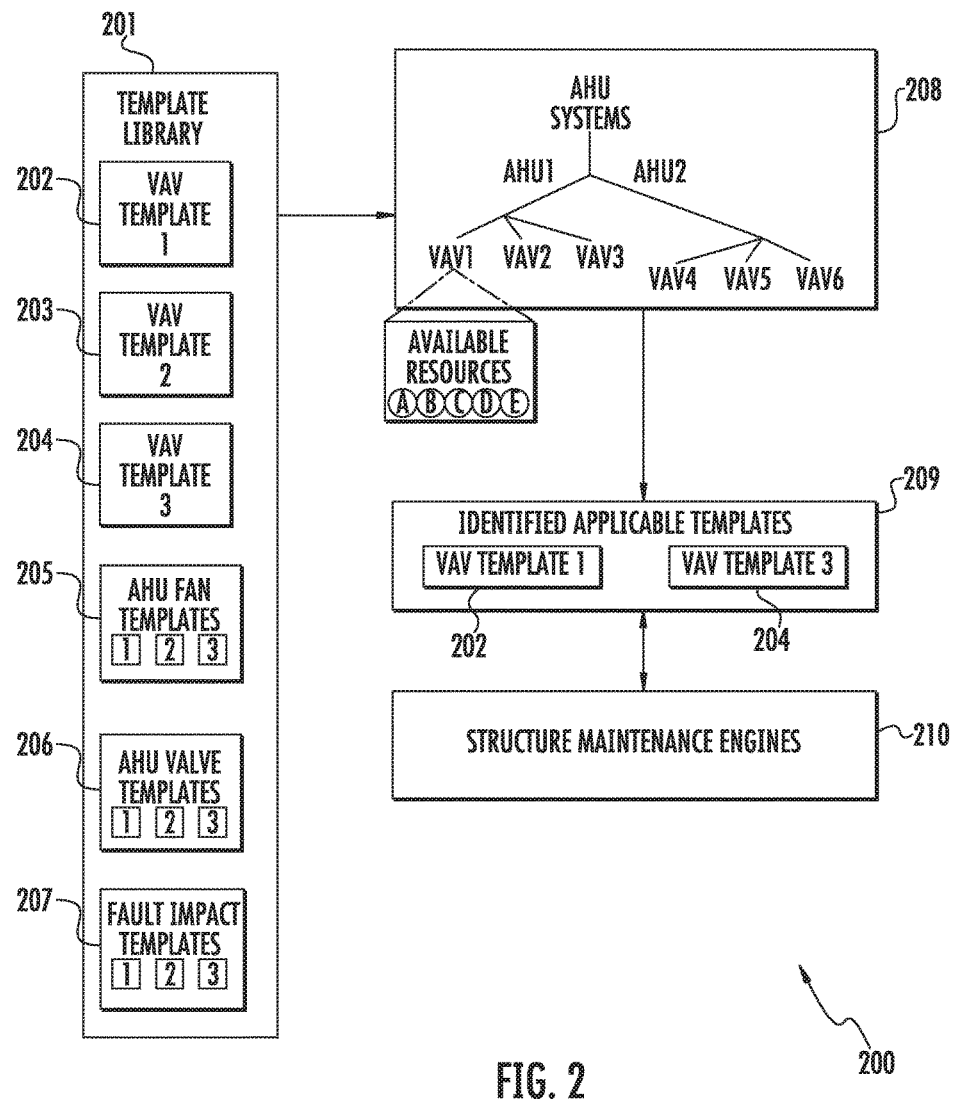
FIG. 2 is a functional diagram of a cyber-physical structure management system according to one embodiment.

FIG. 2 illustrates a functional block diagram of a cyber-physical structure management system 200 according to an embodiment of the invention. The cyber-physical structure management system 200 of FIG. 2 illustrates an example related to air handler units (AHUs) of a cyber-physical structure and variable air volume (VAV) units of the AHUs. This context is provided only by way of example, and embodiments relate to any type of device or system that controls or conditions an environment, obtains data from the environment, or provides data to a user about an environment.

The system 200 includes a template library 201 including VAV templates 202, 203, and 204. The template library 201 also includes AHU fan templates 205, AHU valve templates 206, and fault impact templates 207. In block 208, the templates from the template library 201 are recursively applied to a tree or graph representing systems of a cyber-physical structure stored in memory as a data model, including a first AHU system AHU1 and a second AHU system AHU2. The AHU systems AHU1 and AHU2 further include VAV units VAV1 . . . VAV6. In block 209, the applicable templates 202 and 204 are identified.

Block 210 represents structure maintenance engines 210 which include diagnostic and control systems, including computer systems and electromechanical systems, which interact with the applicable templates 209 which have been deployed as operating systems in a cyber-physical structure to perform diagnostic and control operations. The engines 210 also include optimization engines, which can utilize applied templates to optimize operation of systems in terms of energy usage, resource usage, or any other desired optimization. The engines 210 may also include functional engines to control operation of resources or devices, or any other types of engines that utilize the applicable templates to manage cyber-physical structures, systems, and devices. The cyber-physical structure-management persists as a data model to preserve knowledge of which dynamic and static structure data is used by which operation algorithm.

Figure 3:
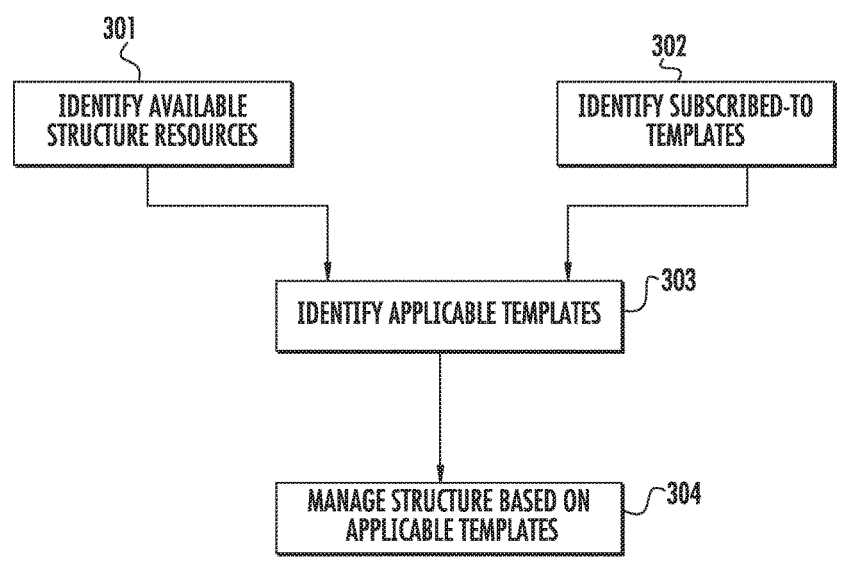
FIG. 3 is a flow diagram of a method for managing a cyber-physical structure according to an embodiment.

FIG. 3 is a flow diagram of a method of managing structure resources of a cyber-physical structure according to one embodiment. In block 301, available structure resources of a cyber-physical structure are identified. The structure resources include dynamic resources configured to provide dynamic structure data over time based on monitoring the cyber-physical structure over time. The structure resources may also include static resources that typically do not change over time, such as design specifications of the cyber-physical structure. In one embodiment, a computer system queries structure resources or accesses data about the structure resources stored in a computer or memory assembly associated with the cyber-physical structure to determine which structure resources exist and are available.

The method includes, in block 302, identifying subscribed-to templates and/or applications. Subscribed-to applications are associated with templates that a user or customer associated with a cyber-physical structure has subscribed to, or to which the user or customer is allowed access. For example, a template provider may provide different levels of templates of different complexity and providing different benefits for different prices. Users or customers may subscribe to only certain types of templates according to the needs or desires of the user or customer. The templates are structure-management templates which include one or more operation algorithms for managing the structure resources and one or more required-resource descriptions defining structure resources required by the one or more operation algorithms. The subscribed-to templates may be identified by a structure-management computer in communication with a template library, repository, server, or computer system.

In block 303, the applicable structure management templates identified based on matching identified structure resources to the required-resource descriptions of the subscribed-to structure management templates. The applicable templates may be identified by recursively analyzing a tree or graph representing systems associated with the cyber-physical structure and the available structure resources to determine which structure-management templates may be applied to the cyber-physical structure.

In block 304, a cyber-physical structure is managed based on the applicable templates. For example, the structure-management templates may be applied by a computer system to manage operation of the cyber-physical structure by implementing the operation algorithms using the dynamic structure data. In one embodiment, the structure-management templates are ranked based on an estimated level of utility to a user, and applying one or more of the applicable structure-management templates includes applying one or more of the applicable structure-management templates having a highest rank.

In one embodiment, managing the cyber-physical structure based on the applicable templates includes at least one of receiving sensor data from the cyber-physical structure and generating control signals to control operation of the structure resources of the cyber-physical structure.

While a limited number of embodiments of the invention have been described in detail, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method of managing structure resources of a cyber-physical structure, comprising:
   identifying the structure resources of the cyber-physical structure, the structure resources including dynamic resources configured to provide dynamic structure data over time based on monitoring the cyber-physical structure over time;
   identifying, by the structure management computer system, subscribed-to structure-management templates which include one or more operation algorithms for managing the structure resources and one or more required-resource descriptions defining structure resources required by the one or more operation algorithms;
   identifying, by the structure management computer system, applicable structure-management templates from among the subscribed-to structure-management templates based on matching the identified structure resources to the required-resource descriptions of the subscribed-to structure-management templates, wherein the applicable structure-management templates are identified by recursively analyzing a tree that represents the identified structure resources of the cyber-physical structure; and
   applying, by the structure management computer system, one or more of the applicable structure-management templates as structure management systems to manage operation of the cyber-physical structure by implementing the operation algorithms using the dynamic structure data.

2. The method of claim 1, wherein the applicable structure-management templates include a diagnostic template for performing diagnostics on one or more structure resources or on the cyber-physical structure, an energy usage template for controlling energy usage of one or more structure resources, and a functional template for controlling operation of one or more structure resources.

3. The method of claim 1, wherein the structure-management templates are ranked based on an estimated level of utility to a user, and
   applying one or more of the applicable structure-management templates includes applying one or more of the applicable structure-management templates having a highest rank.

4. The method of claim 1, wherein the structural resources include both the dynamic resources and static resources, the static resources including cyber-physical characteristics of the cyber-physical structure that do not change over time, and
   the required-resource descriptions include both descriptions of required dynamic resources and required static resources.

5. The method of claim 1, wherein applying the one or more of the structure-management templates as structure-management systems includes at least one of receiving, by the structure management computer system, sensor data from the cyber-physical structure and generating, by the structure-management computer system, control signals to control operation of the structure resources of the cyber-physical structure.

6. A structure management computer system, comprising:
memory for storing dynamic structure data received from structure resources of a cyber-physical structure, the dynamic structure data generated by dynamic structure resources over time based on monitoring the cyber-physical structure over time; and
at least one processor configured to:
identify the structure resources of the cyber-physical structure;
identify subscribed-to structure-management templates which include one or more operation algorithms for managing the structure resources and one or more required-resource descriptions defining structure resources required by the one or more operation algorithms;
identify applicable structure-management templates from among the subscribed-to structure-management templates based on matching the identified structure resources to the required-resource descriptions of the subscribed-to structure-management templates, wherein the applicable structure-management templates are identified by recursively analyzing a tree that represents the identified structure resources of the cyber-physical structure; and
apply one or more of the applicable structure-management templates as structure management systems to manage operation of the cyber-physical structure by implementing the operation algorithms using the dynamic structure data.

7. The structure management computer system of claim 6, wherein the applicable structure-management templates include a diagnostic template for performing diagnostics on one or more structure resources or on the cyber-physical structure, an energy usage template for controlling energy usage of one or more structure resources, and a functional template for controlling operation of one or more structure resources.

8. The structure management computer system of claim 6, wherein the structure-management templates are ranked based on an estimated level of utility to a user, and applying one or more of the applicable structure-management templates includes determining a rank of each of the applicable structure-management templates, and applying the applicable structure-management templates in order of highest rank to lowest rank.

9. The structure management computer system of claim 6, wherein the structural resources include both the dynamic resources and static resources, the static resources including cyber-physical characteristics of the cyber-physical structure that do not change over time, and the required-resource descriptions include both descriptions of required dynamic resources and required static resources.

10. The structure management computer system of claim 6, wherein the at least one processor is configured to apply the one or more of the structure-management templates as structure-management systems by receiving sensor data from the cyber-physical structure and generating control signals to control operation of the structure resources of the cyber-physical structure.

11. A structure-management template distribution system, comprising:
memory having stored therein structure-management templates for managing operation of a cyber-physical structure, the structure-management templates including one or more operation algorithms for managing structure resources of the cyber-physical resources, and one or more required-resource descriptions defining structure resources required by the one or more operation algorithms, the structure resources including dynamic resources configured to provide dynamic structure data over time based on monitoring the cyber-physical structure over time, the memory further storing customer subscription data; and
a processor configured to:
generate the customer subscription data based on receiving customer input regarding structure-management templates and applications that are to be made available to the customer;
identify, based on the customer subscription data, one or more structure-management templates, of the stored structure-management templates, that the customer has subscribed to;
identify applicable structure-management templates from among the one or more structure-management templates based on matching the structure resources to the required-resource descriptions of the one or more management templates, wherein the applicable structure-management templates are identified by recursively analyzing a tree that represents the structure resources of the cyber-physical structure; and
distribute the applicable structure-management templates to a customer computer.

12. The structure-management template distribution system of claim 11, wherein the structure-management template distribution system includes a graphical user interface (GUI) generator configured to display a GUI accessible by a customer to select the structure-management templates that are to be made available to the customer.

13. The structure-management template distribution system of claim 11, wherein the structure-management templates include a diagnostic template for performing diagnostics on one or more structure resources or on the cyber-physical structure, an energy usage template for controlling energy usage of one or more structure resources, and a functional template for controlling operation of one or more structure resources.

14. The structure-management template distribution system of claim 11, wherein the structural resources include both the dynamic resources and static resources, the static resources including cyber-physical characteristics of the cyber-physical structure that do not change over time, and
the required-resource descriptions include both descriptions of required dynamic resources and required static resources.

* * * * *